United States Patent [19]

Trop

[11] Patent Number: 4,530,850

[45] Date of Patent: Jul. 23, 1985

[54] POWDERED COMPOSITIONS AND PROCESS FOR THE MANUFACTURE OF NON-GELLED ACIDIFIED MILK PRODUCT DRINKS

[75] Inventor: Moshe Trop, Beer Sheva, Israel

[73] Assignee: Ben-Gurion University of the Negev Research and Development Authority, Israel

[21] Appl. No.: 620,031

[22] Filed: Jun. 13, 1984

Related U.S. Application Data

[63] Continuation-in-part of Ser. No. 386,787, Jun. 7, 1982, abandoned.

[30] Foreign Application Priority Data

Jun. 10, 1981 [IL] Israel .................................... 63071

[51] Int. Cl.³ .................... A23C 9/156; A23C 11/06; A23L 2/38
[52] U.S. Cl. .................................. 426/584; 426/590; 426/658
[58] Field of Search ............... 426/573, 575, 576, 578, 426/580, 583, 584, 588, 590, 654, 657, 658

[56] References Cited

U.S. PATENT DOCUMENTS

| | | | |
|---|---|---|---|
| 3,080,236 | 3/1963 | Ferguson | 426/580 X |
| 3,793,465 | 2/1974 | Bohren | 426/580 X |
| 3,868,465 | 2/1975 | Furda et al. | 426/444 X |
| 3,899,598 | 8/1975 | Fischer et al. | 426/576 X |
| 3,917,875 | 11/1975 | Gardiner | 426/573 |
| 3,927,221 | 12/1975 | Kalafatas et al. | 426/576 |
| 3,955,009 | 5/1976 | Eskritt et al. | 426/583 X |
| 4,081,567 | 3/1978 | Haber | 426/583 X |
| 4,110,476 | 8/1978 | Rhodes | 426/583 X |
| 4,200,662 | 4/1980 | Scibelli | 426/583 |
| 4,216,243 | 8/1980 | Hermann | 426/583 |
| 4,264,638 | 4/1981 | Sirett et al. | 426/584 X |
| 4,289,788 | 9/1981 | Cajigas | 426/583 X |
| 4,309,417 | 1/1982 | Staples | 426/583 X |
| 4,325,979 | 4/1982 | Trop et al. | 426/576 X |

FOREIGN PATENT DOCUMENTS

| | | | |
|---|---|---|---|
| 1031622 | 5/1979 | Canada | 426/583 |
| 19415 | 11/1980 | European Pat. Off. | 426/583 |
| 1255391 | 12/1971 | United Kingdom | 426/576 |

*Primary Examiner*—Arthur L. Corbin
*Attorney, Agent, or Firm*—Lowe, King, Price & Becker

[57] ABSTRACT

The invention provides a powdered composition that, upon mixing with milk, forms a non-gelled, acidified, milk-product drink without curdling of the milk proteins, the composition comprising about 1 to about 9 percent of an edible acid, about 0.5 to about 1.9 percent of an instant cold-water soluble gelatine, about 1 to about 10 percent of an edible natural or modified polysaccharide gum, about 20 to about 90% sweetening agents and about 0.0 percent to an effective amount of flavoring and coloring agents as well as providing a powdered composition that, upon mixing with water, forms a non-gelled, acidified, milk-product drink without curdling of casein proteins, the composition comprising about 1 to about 9 percent of an edible acid, about 0.5 to about 1.9 percent of an instant cold-water soluble gelatine, about 1 to about 10 percent of an edible natural or modified polysaccharide gum, about 5% to about 60 percent of a casein protein source, about 20 to about 90% sweetening agents and about 0.0 percent to an effective amount of flavoring and coloring agents, all percentages being by weight of the powdered composition and the ratio of gum to gelatine in both compositions being between about 2:1 and 10:1 to assure the formation of a non-gelled liquid milk product.

14 Claims, No Drawings

POWDERED COMPOSITIONS AND PROCESS FOR THE MANUFACTURE OF NON-GELLED ACIDIFIED MILK PRODUCT DRINKS

This application is a continuation-in-part of Ser. No. 386,787, filed June 7, 1982, now abandoned.

The present invention relates to powdered compositions for the manufacture of non-gelled acidified, milk-product drinks. More particularly, the present invention relates to a powdered composition suitable for mixing with milk or water to form a non-gelled acidified milk product drink having the delicate texture and tangy taste normally associated with natural yogurt and other sour milk products.

Yogurt is a milk product having a gelled texture and is biologically acidified by means of *Lactobacillus Bulgaricus* and *Streptococcus Thermophilus*, the pH of which is about 4.1 to 4.6.

The basic theory behind the use of yogurt has been to implant a beneficial culture of *Lactobacillus Bulgaricus-Lactobacillus Acidophilus* in milk, to allow this mixture to incubate until these particular species of bacilli sour the milk and then chill the product to prevent further growth.

The use of yogurt has been quite popular and common as it forms not only a healthful but a pleasant food substance which may be enjoyed for its flavor, its health qualities or its reputed regulatory effect on the bowel movement.

When yogurt in its usual form is dehydrated, it cannot be reconstituted into the smooth, creamy, pleasant tasting product by the simple addition of water, as might be expected.

It has been found that during drying the characteristic texture of the yogurt is lost, the yogurt reconstituted from yogurt powder with water remains fluid and the coagulated phase tends to separate rapidly from the aqueous phase.

Previous attempts to manufacture yogurt in powder form have resulted in a culture which could be implanted in milk and allowed to grow quickly and vigorously in a type of "do-it-yourself" yogurt manufacture. These attempts, however, at rapid manufacture of yogurt have resulted in poorly controlled growth conditions which yielded an inferior quality and taste.

The method described in U.S. Pat. No. 3,793,465, where a milk product is biologically acidified to pH of 4.2 and combined with a non-acidified milk product and acid compound with control release to yield a yogurt-like product, has also proven to be too expensive and not practical.

In U.S. Pat. No. 3,080,236 there is described an instant yogurt product adapted, when mixed with water, to form a synthetic yogurt composition, said product comprising dried yogurt culture, a water soluble dried milk, an edible vegetable oil and a water-soluble dried starch, however, as will be realized said patent is also based on a powdered yogurt culture, which is dried in a vacuum drier to overcome some of the prior dehydrating and reconstituting difficulties.

In U.S. Pat. No. 3,917,875 (Gardiner) there is described a powdered dessert composition suitable for mixing with milk to obtain a gelled acidic dessert consisting essentially of 5.0 to 20.0 percent of a cold water-soluble gelatin, 0.2 to 5.0 percent of a stabilizer, 5.0 to 25.0% of a pregelatinized starch, 2.0 to 7.0 percent of a food acid, 40.0 to 75.0 percent of a sweetening agent, from 0.0 to 25.0 percent yogurt powder, from 0.0 to 10.0 percent of an emulsifier and from 0.0 to an effective amount of color and flavoring ingredients, all percentage being by weight of the powdered dessert composition. Said patent, however, is directed to the production of a gelled yogurt pudding-like dessert and does not teach or suggest the ingredients necessary for production of a non-gelled fluid yogurt drink.

Similarly, in U.S. Pat. No. 4,289,788 (Cajigas) there is described an instant powdered composition comprising a mixture of (a) from about 0.01 to 5 percent by weight Lactobacillus culture, (b) from about 1 to about 35 percent by weight deactivated yogurt powder, (d) from about 2 to about 25 percent by weight gelatin, (d) from about 0.1 to about 20 percent by weight locust bean gum and (e) from about 10 to about 50 percent by weight of a mixture of acid whey and citric acid based upon the weight of the total composition.

In contradistinction to said prior art products, the present invention provides a powdered composition suitable for mixing with milk to obtain a non-gelled, acidified milk-product drink without curdling of the milk proteins, said composition comprising about 1 to about 9 percent of an edible acid, about 0.5 to about 1.9 percent of an instant cold-water soluble gelatine, about 1 to about 10 percent of an edible natural or modified polysaccharide gum, about 20 to about 90 percent sweetening agents and about 0.0 percent to an effective amount of flavoring and coloring agents, all percentages being by weight of the powdered composition, and the ratio of said gum to said gelatine being between about 2:1 and 10:1 to assure the formation of a non-gelled, liquid, milk-product drink, as well as providing a powdered composition suitable for mixing with water to obtain a non-gelled acidified, milk product drink without curdling of casein proteins, said composition comprising about 1 to about 9 percent of an edible acid, about 0.5 to about 1.9 percent of an instant cold-water soluble gelatine, about 1 to about 10 percent of an edible natural or modified polysaccharide gum, about 5 to about 60 percent of a casein protein source, about 20 to about 90 percent sweetening agents and about about 0.0 percent to an effective amount of flavoring and coloring agents, all percentages being by weight of the powdered composition, and the ratio of said gum to said gelatine being between about 2:1 and 10:1 to assure the formation of a non-gelled, liquid, milk-product drink.

Preferably said compositions will also comprise about 0.1 to about 3% of an emulsifier, such as mono and di glycerides of fatty acids, sorbitan mono fatty acid, sodium steroyl lactylate, citric acid esters of glyceryl fatty acids, etc.

While it will be noted that there are certain similarities between the composition of the present invention and those of Cajigas and Gardiner, said patents did not appreciate the problem which the present invention solves and therefore did not teach or suggest the unique formulation of the present invention.

More specifically and as shown in comparative example 3 hereinafter, the prior art compositions, upon being reconstituted with water or milk, are not drinkable since they are formulated to gel into a yogurt-like composition; whereas the compositions of the present invention are formulated so that upon addition of water or milk gelling will not occur and the resulting product will be a liquid drink.

Thus there is a novel and unexpected criticality in providing a powder having about 0.5 to about 1.9 percent of an instant cold-water soluble gelatine and a ratio of gum to gelatine between about 2:1 and 10:1.

Referring specifically to the Cajigas patent, it is noted that in Col. 1, lines 65 to 68 it is stated that "The texture of a yogurt is also an important factor in determining its acceptability, for yogurt should be free of lumps or curds and exhibit a smooth, custard-like consistency until the set is broken". Similarly, Column 4, lines 47 to 50 states "Kelco Gel, functions in the context of an instant yogurt preparation in accordance with the invention as a gelling or setting agent to impart to the final product a custard-like consistency", and Column 4, lines 58 and 59 states "This enables the yogurt to set firm". Thus, it is clear that the instant yogurt composition of Cajigas is one that, upon mixing with milk or water, forms a custard-like yogurt which firmly sets.

Similarly, Gardiner states in column 1, lines 8 to 10 that "The composition comprises a dry powder mix which may be whisked with milk to form a dessert which is like yogurt in both texture and flavor". Thus, Gardiner is also directed to a formulation resulting in a yogurt texture, which as explained for Cajigas, is a firmly set texture and consistency and is not a drink product.

It will be further noted that there are specific differences between the compositions in dry form of said prior art patents and the powdered compositions of the claimed invention that are inherently responsible for the difference in the final products produced. First, while gelatine creates a gel texture, gum interferes with gelling and the ratio of gum to gelatine gives the texture balance. Furthermore, the presence of gum acts synergistically with gelatine to make it into a thickener rather than a gelling agent when the ratios according to the present invention and as exemplified in the examples of the present application are used.

Thus it will be noted that Cajigas has a gum to gelatine ratio of 0.1 to 20 percent gum in combination with 2 to 25% gelatine and a preferred ratio of 1 to 3% gum in combination with 4 to 7% gelatine, i.e., the preferred relationship of gelatine to gum is substantially greater than the composition of the present invention in which the opposite relationship is specifically disclosed and claimed for the first time.

Similarly, the parts by weight indicated in the preferred example of Cajigas show that the ratio of gum to gelatine is 1.46:4.86 (or about 1:3.3).

As with Cajigas, Gardiner teaches that the weight percent range of gelatine is in the amount of 5.0 to 20.0%, preferably 11.0 to 15.0 percent (column 2, lines 21-24) while the preferred weight percentage of stabilizing agent (such as gum) is much lower, i.e., from 0.2 to 5.0%, preferably 0.5 to 1.0% (column 2, lines 28-30).

Another difference between the composition of Cajigas and that of the present invention is that the composition of Cajigas contains between about 10 to about 50% and preferably 15 to about 25% acid while the compositions of the present invention contain between 1 to 9% acid. Thus, the compositions of the present invention are only slightly acidic with a pH near and slightly higher than the isoelectric point of casein, resulting in the fact that the casein hardly coagulates, if at all, while Cajigas has a much higher acid concentration and a resulting lower pH that is below the isoelectric point of casein thereby resulting in its coagulation and/or curdling.

Similarly, the powdered composition of Gardiner contains between 5 and 20% cold-water soluble gelatine and preferably between 11 and 15% gelatine as opposed to the composition of the present invention which contains between about 0.5 and 1.9% cold-water soluble gelatine, i.e., a percentage which is totally outside the range disclosed by Gardiner and substantially lower than the preferred range taught by Gardiner, once again emphasizing the fact that Gardiner is preparing a set yogurt composition requiring a high percentage of gelatine to assure gelling, while the present invention in contradistinction to the prior art patents teaches a composition which forms a non-gelled liquid drink.

As will be realized the invention also provides a non-gelled acidified milk product drink comprising the admixture of (a) a dry powdered composition containing about 1 to about 9 percent of an edible acid, about 0.5 to about 1.9 percent of an instant cold-water soluble gelatine, about 1 to about 10 percent of an edible natural or modified polysaccharide gum, about 20 to about 90 percent sweetening agents, and about 0.0 percent to an effective amount of flavoring and coloring agents, all percentages being by weight of the dry powdered composition and the ratio of said gum to said gelatine being between about 2:1 and 10:1 and (b) fluid milk, and a non-gelled acidified milk product drink comprising the admixture of (a) a dry powdered composition containing about 0.5 to about 1.9 percent of an instant cold water soluble gelatine, about 1 to about 10 percent of an edible natural or modified polysaccharide gum, about 5 to about 60 percent of a casein protein source, about 20 to about 90 percent sweetening agents, and about 0.0 percent to an effective amount of flavoring and coloring agents, all percentages being by weight of the dry powdered composition and the ratio of said gum to said gelatine being between about 2:1 and 10:1 and (b) water.

Also provided is a process for the manufacture of a fluid non-gelled acidified milk product drink comprising admixing (a) a dry powdered composition containing about 1 to about 9 percent of an edible acid, about 0.5 to about 1.9 percent of an instant cold-water soluble gelatine, about 1 to about 10 percent of an edible natural or modified polysaccharide gum, about 20 to about 90 percent sweetening agents, and about 0.0 percent to an effective amount of flavoring and coloring agents, all percentages being by weight of the dry powdered composition and the ratio of said gum to said gelatine being between 2:1 and 10:1 and (b) fluid milk, and a process for the manufacture of a fluid non-gelled acidified milk product drink comprising admixing (a) a dry composition containing about 0.5 to about 1.9 percent of an instant cold water soluble gelatine, about 1 to about 9 percent of an edible acid, about 1 to about 10 percent of an edible natural or modified polysaccharide gum, about 5 to about 60 percent of a casein protein source, about 20 to about 90 percent sweetening agents, and about 0.0 percent to an effective amount of flavoring and coloring agents, all percentages being by weight of the powdered compositions and the ratio of said gum to said gelatine being between about 2:1 and 10:1 and (b) water.

As indicated hereinbefore, when the composition is to be combined with water a source of casein protein must be provided and said casein protein source is preferably selected from the group consisting of whey powder, desalting whey powder, whey protein concentrate, sodium caseinate, calcium caseinate, non-fat milk solids, whole milk solids and combinations thereof.

Spray-dried yogurt containing the live bacteria *Lactobacillus Bulgaricus, Streptococcus Thermophilus* and

*Lactobacillus Acidophilus* is also preferably incorporated into said compositions in amounts of about 0.1 to 60%. The major problem with making a yogurt drink by direct addition of acid to milk is that the milk proteins precipitate as the pH reach the net isoelectric point of the proteins. Due to curdling of milk, it is not practical to use an acid in a milk-based dessert or drink, particularly when a dry mix is to be employed. According to the present invention, however, it has been found that a liquid milk could keep a desirable texture of a drink by employing a unique combination of an edible acid, a polysaccharide gum and an instant gelatine, as defined.

Such a drink can be prepared by the consumer or housewife instantly by dissolving the powder compositions of the invention in milk or water and either by mixing or shaking until the drink is ready. The texture is further improved, however, by keeping the drink for about 15 minutes in a refrigerator after mixing.

The combination of the above ingredients increases the drink stability without coagulation and curdling of the milk proteins and it is believed that the basic gelatine molecules attach to the acidic moieties of the casein and stabilizes it at lower pH. The addition of the gum is believed to improve the viscosity and texture of the product while the optional but preferred addition of an emulsifier improves the dispersion of the lipid and non-soluble particles present in the final product.

The edible acid used is preferably selected from the group consisting of citric, tartaric, malic, lactic, fumaric and adipic acids and combinations thereof and said modified polysaccharide gum is preferably selected from the group consisting of guar, sodium carboxymethyl cellulose, pregelatinized starch, galactomannan, locust bean gum, carrageenan and dextrin.

In preferred compositions of the present invention the ratio of said gum to said gelatine is between about 2:1 and 5:1.

The instant gelatine preferably will be at least 95 percent pure gelatine and in the following examples the instant gelatine used was Cryogel ® obtained from Pb. Gelatine Belgium which is advertised as being 100 percent pure gelatine.

While the invention will now be described in connection with certain preferred embodiments in the following examples, it will be understood that it is not intended to limit the invention to these particular embodiments. On the contrary, it is intended to cover all alternatives, modifications and equivalents as may be included within the scope of the invention as defined by the appended claims. Thus, the following examples which include preferred embodiments will serve to illustrate the practice of this invention, it being understood that the particulars shown are by way of example and for purposes of illustrative discussion of preferred embodiments of the present invention only and are presented in the cause of providing what is believed to be the most useful and readily understood description of formulation procedures as well as of the principles and conceptual aspects of the invention.

Example 1 — Orange Flavored Yogurt Drink

A batch of powdered composition suitable for combination with milk to form an orange flavored yogurt drink was prepared with the following ingredients:

| | |
|---|---|
| ground sugar | 209 g |
| citric acid | 18.5 g |
| gum guar | 12.5 g |
| mono and diglyceride | 1.5 g |
| yogurt flavor | 8 g |
| instant gelatine | 5 g |
| spray dried yogurt | 1 g |
| orange flavor | 1 g |
| coloring | 0.1 g |

The resulting dry composition was then divided into thirteen equal portions each portion being suitable for mixture with one glass of milk either by mixing in a blender at high speed for 10 seconds or merely shaking well in shaker until all the powder is completely dissolved. The resulting non-gelled yogurt drinks were placed in a refrigerator for ten minutes and were then ready to serve.

Example 2 — Peach flavored Yogurt Drink A batch of powdered composition suitable for combination with water to form a peach flavored yogurt drink was prepared with the following ingredients:

| | |
|---|---|
| sugar | 210 g |
| citric acid | 12 g |
| fumaric acid | 10 g |
| galactomannan | 12 g |
| citric acid ester of glyceryl fatty acid | 1 g |
| instant gelatine | 5.5 g |
| spray dried cultured milk | 10 g |
| peach flavor | 1.5 g |
| coloring | 0.2 g |
| spray dried whey powder | 100 g |
| spray dried whey protein | 50 g |
| whole milk powder | 25 g |
| non fat milk powder | 30 g |

The resulting dry composition was then divided into 10 equal portions each suitable for mixture with 200 ml water as described in Example 1.

As will be realized, the present invention provides an acidified dry mix, which can be reconstituted quickly and simply with cold milk or with cold water without curdling of milk protein. The resulting liquid product is a tangy yogurt drink, which will not deteriorate on standing for relatively long periods after its preparation.

Using the basic ingredients as described above, a multitude of different yogurt drink dry mix products can be prepared.

Thus, the following tables will indicate some preferred ranges of ingredients for preparing mixes suitable for mixing with milk or water.

| | DRY MIX | |
|---|---|---|
| Ingredients | Percent in composition to be mixed with milk | Percent in composition to be used wtih water |
| acid | 2-8% | 1-7% |
| instant gelatine | 1-1.9% | 0.5-1.5% |
| gum | 2-10% | 1-3.5% |
| sugar | 60-85% | 30-43% |
| spray dry yogurt or cultured non fat dry milk | 0-20% | 0-20% |
| fruit flavor | 0.1%-1% | 0.07-0.7% |
| yogurt flavor | 0-1% | 0-0.7% |
| emulsifier | 0-2% | 0-3% |
| casein protein source, e.g. whey powder, whey protein, non-fat milk | 0-10% | 40-60% |

-continued

| | DRY MIX | |
|---|---|---|
| Ingredients | Percent in composition to be mixed with milk | Percent in composition to be used wtih water |
| solids | | |

It will be realized that when amounts in the upper range of percentages of instant gelatine are used proportionally higher upper ranges of gum will also be used to assure a ratio of gum to gelatine of at least 2:1.

In preparing the drinks with the compositions of the present invention preferably about 18–25 g of a composition to be mixed with milk and about 36–50 g of a composition to be mixed with water are combined with 200 cc liquid.

Comparative Example 3

In order to demonstrate the criticality of the amount of gelatine employed in the present compositions and to show the differences in the characteristics of the presently claimed yogurt drink and the yogurt of Cajigas, there was prepared a yogurt powder base according to the present formula, which was also in the theoretical range set forth by Cajigas but without instant gelatin. It contained the following ingredients:

| | | |
|---|---|---|
| ground sugar | | 209 g |
| citric acid | | 18.5 g |
| mono di glyceride | | 0.9 g |
| guar gum | | 12.5 g |
| yogurt flavor | | 8 g |
| orange flavor | | 1 g |
| coloring | | 0.1 g |
| | total | 250 g |

A series of 6 tests were then conducted by adding instant gelatine ("cryogel" — made by Pb gelatin — Belgium) in the following amounts:

| | |
|---|---|
| 1. 2 g - 0.8% | 4. 5 g - 2.0% |
| 2. 4 g - 1.6% | 5. 7 g - 2.8% |
| 3. 4.5 g - 1.8% | 6. 10 g - 4.0% |

The resulting powder was then mixed (10 g in 200 ml) with milk, kept 15 min in a refrigerator and measured for viscosity. The following are the results:

| | |
|---|---|
| 1. 9.5 cp | 4. 24.3 cp |
| 2. 17 cp | 5. 27.5 cp |
| 3. 18.5 cp | 6. 29.0 cp |

Only the first three samples containing less than 2% gelatine did not coagulate and resulted in the desired drink product instead of a set yogurt product.

It will be evident to those skilled in the art that the invention is not limited to the details of the foregoing illustrative embodiments and examples and that the present invention may be embodied in other specific forms without departing from the essential attributes thereof, and it is, therefore, desired that the present embodiments and examples be considered in all respects as illustrative and not restrictive, reference being made to the appended claims, rather than to the foregoing description, and all changes which come with the meaning and range of equivalency of the claims are, therefore, intended to be embraced therein.

What is claimed is:

1. A powdered composition that, upon mixing with milk, forms a non-gelled, acidified, milk-product drink without curdling of the milk proteins, said composition comprising about 1 to about 9 percent of an edible acid, about 0.5 to about 1.9 percent of an instant cold-water soluble gelatine, about 1 to about 10 percent of an edible natural or modified polysaccharide gum, about 20 to about 90 percent sweetening agents and about 0.0 percent to an effective amount of flavoring and coloring agents, all percentages being by weight of the powdered composition, and the ratio of said gum to said gelatine being between about 2:1 and 10:1 to assure the formation of a non-gelled, liquid, milk-product drink.

2. A powdered composition that, upon mixing with water, forms a non-gelled acidified, milk-product drink without curdling of casein proteins, said composition comprising about 1 to about 9 percent of an edible acid, about 0.5 to about 1.9 percent of an instant cold-water soluble gelatine, about 1 to about 10 percent of an edible natural or modified polysaccharide gum, about 5 to about 60 percent of a casein protein source, about 20 to about 90 percent sweetening agents and about 0.0 percent to an effective amount of flavoring and coloring agents, all percentages being by weight of the powdered composition, and the ratio of said gum to said gelatine being between about 2:1 and 10:1 to assure the formation of a non-gelled, liquid, milk-product drink.

3. A powdered composition according to claim 1 or 2 further comprising about 0.1 to about 3 percent emulsifier.

4. A powdered composition according to claim 3 wherein said emulsifier is selected from the group consisting of mono and di-glycerides of fatty acids, sorbitan mono fatty acid, sodium steroyl lactylate and citric acid esters of glyceryl fatty acids.

5. A powdered composition according to claim 1 or 2 wherein said instant gelatine is at least 95 percent pure gelatine.

6. A powdered composition according to claim 1 or 2 further comprising about 0.01 to about 60 percent spray dried yogurt.

7. A powdered composition according to claim 2 wherein said casein protein source is selected from the group consisting of whey powder, desalting whey powder, whey protein concentrate, sodium caseinate, calcium caseinate. non-fat milk solids, whole milk solids and combinations thereof.

8. A powdered composition according to claim 1 or 2 wherein said edible acid is selected from the group consisting of citric, tartaric, malic, lactic, fumaric and adipic acids and combinations thereof.

9. A powdered composition according to claim 1 or 2 wherein said modified polysaccharide gum is selected from the group consisting of guar gum, sodium carboxymethyl cellulose, pregelatinized starch, galactomannan gum, locust bean gum, dextrin and carrageenan.

10. A powdered composition according to claim 1 or 2 wherein the ratio of said gum to said gelatine is between about 2:1 and 5:1.

11. A non-gelled acidified milk product drink comprising the admixture of (a) dry powdered composition containing about 1 to about 9 percent of an edible acid, about 0.5 to about 1.9 percent of an instant cold-water soluble gelatine, about 1 to about 10 percent of an edible natural or modified polysaccharide gum, about 20 to about 90 percent sweetening agents, and about 0.0 percent to an effective amount of flavoring and coloring agents, all percentages being by weight of the dry powdered composition, and the ratio of said gum to said gelatine being between about 2:1 and 10:1 and (b) fluid milk.

12. A non-gelled acidified milk product drink comprising the admixture of (a) a dry powdered composition containing about 0.5 to about 1.9 percent of an instant cold water soluble gelatine, about 1 to about 10 percent of an edible natural or modified polysaccharide gum, about 5 to about 60 percent of a casein protein source, about 20 to about 90 percent sweetening agents, and about 0.0 percent to an effective amount of flavoring and coloring agents, all percentages being by weight of the dry powdered composition, and the ratio of said gum to said gelatine being between about 2:1 and 10:1 and (b) water.

13. A process for the manufacture of a fluid non-gelled acidified milk product drink comprising admixing (a) a dry powdered composition containing about 1 to about 9 percent of an edible acid, about 0.5 to about 1.9 percent of an instant cold-water soluble gelatine, about 1 to about 10 percent of an edible natural or modified polysaccharide gum, about 20 to about 90 percent sweetening agents, and about 0.0 percent to an effective amount of flavoring and coloring agents, all percentages being by weight of the dry powdered composition, and the ratio of said gum to said gelatine being between 2:1 and 10:1 and (b) fluid milk.

14. A process for the manufacture of a fluid non-gelled acidified milk product drink comprising admixing (a) a dry powdered composition containing about 0.5 to about 1.9 percent of an instant cold water soluble gelatine, about 1 to about 9 percent of an edible acid, about 1 to about 10 percent of an edible natural or modified polysaccharide gum, about 5 to about 60 percent of a casein protein source, about 20 to about 90 percent sweetening agents, and about 0.0 percent to an effective amount of flavoring and coloring agents, all percentages being by weight of the powdered composition, and the ratio of said gum to said gelatine being between about 2:1 and 10:1 and (b) water.

* * * * *